(12) United States Patent
Yim et al.

(10) Patent No.: US 9,407,178 B2
(45) Date of Patent: Aug. 2, 2016

(54) METHOD AND APPARATUS FOR CONTROLLING AN ELECTRIC MACHINE IN A SIX-STEP MODE

(71) Applicant: GM GLOBAL TECHNOLOGY OPERATIONS LLC, Detroit, MI (US)

(72) Inventors: Jung Sik Yim, Torrance, CA (US); Jihoon Jang, Torrance, CA (US); Bon Ho Bae, Novi, MI (US); Milan A. Vadera, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 81 days.

(21) Appl. No.: 14/541,177

(22) Filed: Nov. 14, 2014

(65) Prior Publication Data
US 2016/0141983 A1    May 19, 2016

(51) Int. Cl.
*H02P 6/08* (2016.01)
*H02P 6/00* (2016.01)

(52) U.S. Cl.
CPC ..................... *H02P 6/002* (2013.01)

(58) Field of Classification Search
CPC ................ H02P 6/00; H02P 6/08; H02P 6/10
USPC ............. 318/400.01, 400.04, 400.07, 400.15, 318/400.22, 700
See application file for complete search history.

(56) References Cited

U.S. PATENT DOCUMENTS

| | | | |
|---|---|---|---|
| 6,704,212 B2 | 3/2004 | Furukawa et al. | |
| 6,842,354 B1 | 1/2005 | Tallam et al. | |
| 7,843,162 B2 | 11/2010 | Bae et al. | |
| 8,253,360 B2 * | 8/2012 | Schulz | B60L 15/025 318/400.02 |
| 8,575,879 B2 * | 11/2013 | Welchko | H02P 27/08 318/400.21 |
| 9,054,611 B2 * | 6/2015 | Liu | H02P 6/08 |
| 2005/0128777 A1 | 6/2005 | Yamanaka et al. | |
| 2014/0070735 A1 | 3/2014 | Luedtke | |

OTHER PUBLICATIONS

Asano, Inaguma, Ohtani, Sato, Okamura, Sasaki; "Hign Performance Motor Drive Technologies for Hybrid Vehicles"; 2007 IEEE.
Hyunjae Yoo, Seung-Ki Sul; "Novel Current Control Strategy for Maximum Tracking Operation under Saturated Voltage Condition"; IAS 2005 IEEE.

(Continued)

*Primary Examiner* — Bentsu Ro
(74) *Attorney, Agent, or Firm* — Quinn Law Group, PLLC

(57) ABSTRACT

A voltage source inverter controller for controlling an inverter electrically connected to an electric machine includes a current command generator, a six-step flux controller and a current regulator. The six-step flux controller generates a flux modifier to regulate flux in a flux-weakening speed/load operating region of the electric machine when operating the electric machine in a six-step mode. The current command generator converts a desired torque to three-phase desired currents that are input to a dq0-dq transformer and combined with the flux modifier to determine a modified-flux direct-quadrature (dq) current request. The current regulator includes a proportional-integral feedback controller, anti-windup elements, a dq voltage limit element and a voltage magnitude limiter. The proportional-integral feedback controller and the anti-windup elements perform closed-loop current control on the modified-flux dq current request to determine commanded dq voltages.

16 Claims, 3 Drawing Sheets

(56) References Cited

OTHER PUBLICATIONS

Del Blanco, Degner, Lorenz; "Dynamic Analysis of Current Regulators for AC Motors Using Complex Vectors"; IEEE vol. 35, No. 6, Nov./Dec. 1999.

Holtz, Lotzkat, Khambadkone; "On Continuous Control of PWM Inverters in the Overmodulation Range Including the Six-Step Mode"; IEEE vol. 8, No. 4, Oct. 1993.

* cited by examiner

METHOD AND APPARATUS FOR CONTROLLING AN ELECTRIC MACHINE IN A SIX-STEP MODE

TECHNICAL FIELD

The present disclosure generally relates to controlling alternating current (AC) motor/generators, and more particularly relates to apparatus, systems and methods for controlling AC motor/generators.

BACKGROUND

Synchronous frame current regulators are employed for current control of AC motor/generators, such as three-phase permanent magnet synchronous electric motors (electric machines). By providing dynamic control over a wide frequency range, synchronous frame current regulators are suited to many industrial applications.

Control of AC motor/generators, such as three-phase permanent magnet synchronous electric motors (electric machines) is accomplished using a three-phase pulsewidth-modulated (PWM) inverter. A PWM inverter can be controlled in several different operation modes, including, e.g., a space vector PWM (SVPWM) mode and a six-step mode. Output voltage magnitude of the inverter at the fundamental frequency becomes its maximum only when an inverter operates in the six-step mode. Due to this voltage magnitude characteristic, operation in the six-step mode can increase torque capability of an electric machine compared to known SVPWM operation or discontinuous space vector PWM (DPWM) operation in the field-weakening region where the voltage magnitude is the major limiting factor of the torque capability. However, voltage magnitude is not controllable in the six-step mode. Only voltage angle can be adjusted in the six-step mode. This is equivalent to loss of 1 Degree-Of-Freedom (DOF) in controllability compared to operation in the normal SVPWM mode or the DPWM mode. Because of this DOF loss, it has proven challenging to employ an asynchronous frame current regulator with a PWM inverter operating in the six-step mode.

SUMMARY

A voltage source inverter controller for controlling an inverter electrically connected to a permanent magnet synchronous multi-phase AC electric machine includes a current command generator, a six-step flux controller and a current regulator. The six-step flux controller generates a flux modifier to regulate flux in a flux-weakening speed/load operating region of the electric machine when operating the electric machine in a six-step mode. The current command generator converts a desired torque to three-phase desired currents that are input to a dq0-dq transformer and combined with the flux modifier to determine a modified-flux direct-quadrature (dq) current request. The current regulator includes a proportional-integral feedback controller, anti-windup elements, a dq voltage limit element and a voltage magnitude limiter. The proportional-integral feedback controller and the anti-windup elements perform closed-loop current control on the modified-flux dq current request to determine commanded dq voltages. This includes the dq-voltage limit element and the voltage magnitude limiter imposing limits to the commanded dq voltages, and the inverter converting the limited commanded dq voltages to pulsewidth-modulated stator currents to drive the electric machine in the six-step mode.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
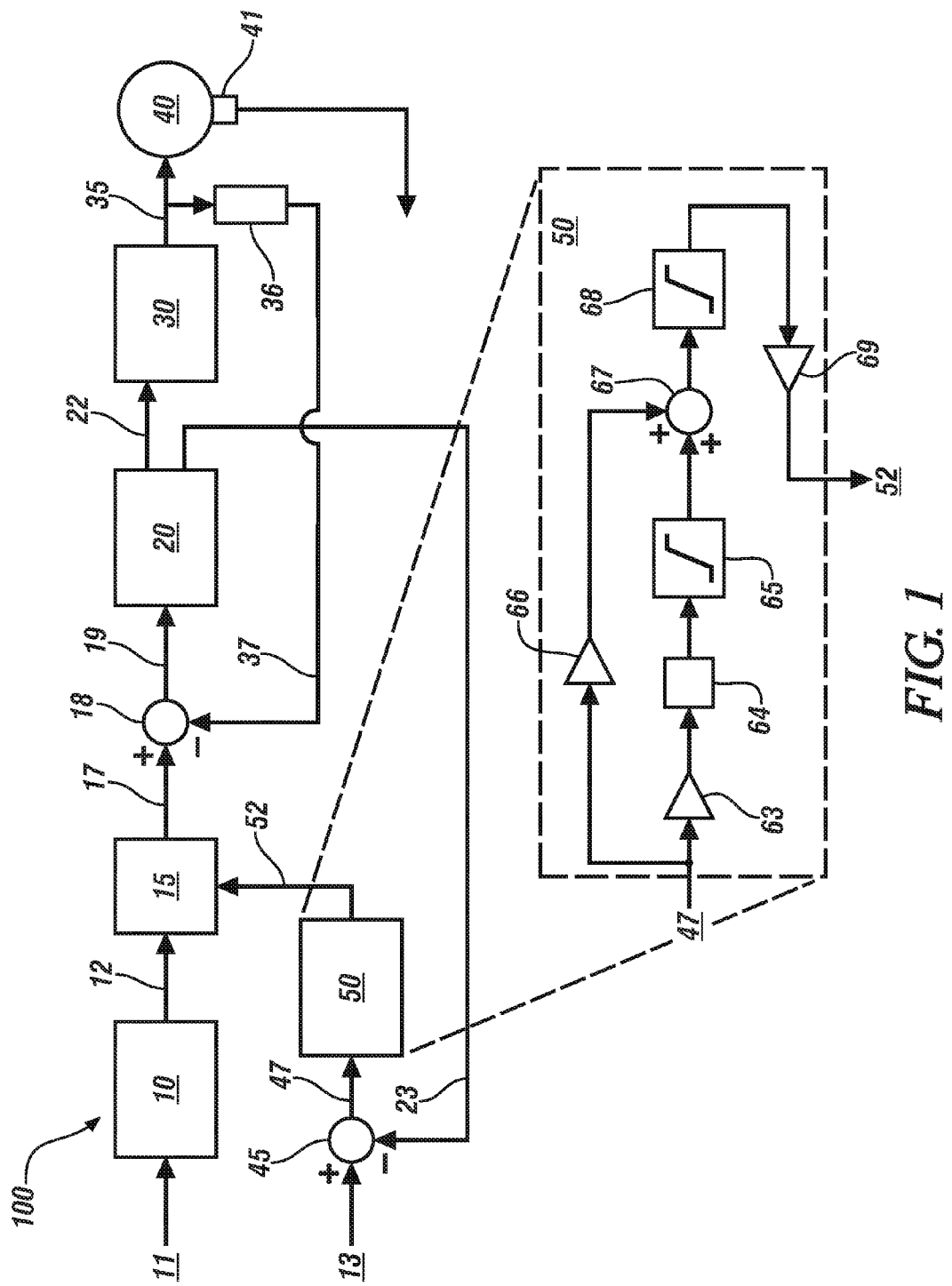
FIG. 1 schematically illustrates a voltage source inverter controller including a current regulator and a six-step flux controller for controlling an inverter electrically connected to a multi-phase AC electric motor/generator (electric machine) in a six-step mode, in accordance with the disclosure.

Referring now to the drawings, wherein the depictions are for the purpose of illustrating certain exemplary embodiments only and not for the purpose of limiting the same, FIG. 1 schematically illustrates a Voltage Source Inverter (VSI) controller 100 for controlling an inverter 30 electrically connected to a multi-phase AC electric motor/generator (electric machine) 40 in accordance with the disclosure. The electric machine 40 is preferably a permanent magnet synchronous device including a stator and a rotor arranged in a star configuration, although the concepts described herein are not so limited. The VSI controller 100 selectively controls operation of the inverter 30 in one of a PWM mode and a six-step mode.

The VSI controller 100 controls torque output from the electric machine 40 through the inverter 30, which electrically connects to a high-voltage DC electric power supply. Control methods for switching among inverter states to regulate torque output of the electric machine 40 include operating in either a PWM mode or a six-step mode. In the PWM mode, the inverter 30 switches rapidly among two of the non-zero states and one of the zero states. The VSI controller 100 specifies what fraction of the time should be spent in each of the three states by specifying PWM duty cycles. The VSI controller 100 updates the PWM duty cycles at regular intervals such that the frequency of updates is significantly higher than the frequency of the rotor rotation. In the six-step mode, the inverter 30 cycles through the six non-zero states once per cycle of the rotor of the electric machine 40 to produce an AC voltage and current in each winding of the stator. A rotor cycle is defined relative to motor poles and does not necessarily correspond to a complete revolution of the rotor.

The VSI controller 100 includes a current regulator 20 and a six-step flux controller 50 for controlling operation of inverter 30 to control operation of the electric machine 40 in the six-step mode. The amplitude of the AC voltage is dictated by the magnitude of DC voltage on the high-voltage DC bus that electrically connects a high-voltage electric power source to the inverter 30. The torque is dictated by the DC voltage, the rotor speed, and the phase difference between these quasi-sinusoidal AC voltage signals and the rotor position, and is further controlled by operating the control system in six-step mode. The VSI controller 100 issues commands to the inverter 30 indicating when to switch to the next state in the sequence.

Inputs to the VSI controller 100 include a desired torque Te* 11 and a desired outer voltage $|U_{dq}*|$ 13. A current command generator 10 converts the desired torque Te* 11 to three-phase (dq0) desired currents $i_{dq0}{}^{r*}$ 12, which are input to a dq0-dq transformer 15. The dq0-dq transformer 15 employs a flux modifier $\Delta\beta$ 52 to determine a modified-flux direct-quadrature (dq) current request $i_{dq}{}^{r*}$ 17. The flux modifier $\Delta\beta$ 52 is determined by the six-step flux controller 50 as described herein. The dq0-dq transformer 15 combines the flux modifier $\Delta\beta$ 52 with a flux term $\beta$ calculated based upon the desired torque Te* 11 and the rotational speed $\omega$ of the rotor. The dq0-dq transformer 15 recalculates the modified-flux direct-quadrature (dq) current request $i_{dq}{}^{r*}$ 17 employing the modified flux ($\beta+\Delta\beta$), which includes converting the dq0 desired currents $i_{dq0}{}^{r*}$ 12 to the modified-flux dq current request $i_{dq\_}{}^{r*}$new 17 employing known dq0-dq transform methodologies. A dq0-dq transform reduces three-phase AC quantities, e.g., $u_a$, $u_b$ and $u_c$ into the dq components, e.g., $u_d$ and $u_q$ to facilitate filtering and control, with the active and reactive powers controlled independently by controlling the dq components.

The six-step flux controller 50 operates when operating the electric machine 40 in the six-step active mode. A process of determining when to control operation of an embodiment of the electric machine 40 in the six-step active mode is described with reference to FIG. 3. The six-step flux controller 50 operates as follows. The magnitude of the desired outer voltage $|u_{dq}*|$ 13 is reduced by a magnitude of the commanded outer voltage $|u_{dq\_out}|$ 23 using a difference element 45 to determine an outer voltage error term 47 that is input to the six-step flux controller 50. The six-step flux controller 50 applies a proportional gain $k_p$ 66 to the outer voltage error term 47 and applies an integral gain $k_i$ 63 that is subject to a time delay 64 and upper and lower integral boundaries 65 to the outer voltage error term 47. The resultants are added by a summing element 67, and subjected to upper and lower flux boundaries 68 and a directional sign 69, wherein negative flux (−) is associated with negative torque, i.e., operation of the electric machine 40 in an electric power regeneration mode and positive flux (+) is associated with positive torque, i.e., operation of the electric machine 40 in a torque generation mode to determine the flux modifier $\Delta\beta$ 52 for the dq current command. The six-step flux controller 50 increases flux in a flux-weakening speed/load operating region of the electric machine 40. The current command and current command angle, $\beta$, changes in a clockwise direction. The actual dq current follows its command until magnitude of the commanded outer voltage, $|u_{dq}|$ 23 is less than six-step, $3/\pi \approx 0.955$, and once after $|u_{dq}|$ reaches the full six-step, the actual dq current moves along with an ellipse that is defined by full six-step voltage magnitude. However, the actual current may have out-and-into movement when the magnitude of the commanded outer voltage $|u_{dq}|$ reaches its full six-step magnitude. This kind of current movement can be critical if the motor speed is in medium range so the controller is in the six-step active mode when current command is at a maximum. The magnitude of the actual current can be larger than its command, and that can damage the inverter and motor. Thus, voltage clamping is employed as described with reference to FIG. 2.

The six-step flux controller 50 supplants a flux-weakening controller when operating the inverter 30 and the electric machine 40 in the six-step active mode. A difference between magnitudes of the outer voltage $|u_{dq}|$ and desired outer voltage $|u_{dq\_out}|$ changes the angle of the dq current command and corresponding flux $\beta$. The command of the outer voltage magnitude $|u_{dq}*|$ is determined based upon the six-step voltages with a recommended calibration factor of 1.2 in one embodiment.

The six-step flux controller 50 prevents jittering of a PWM alignment flag because it keeps the magnitude of the outer voltages greater than the six-step limit. This feature is helpful especially when the motor temperature is high thus weakening the magnet flux. The six-step flux controller 50 helps to keep the magnitude of the actual current as close as possible to that of the command current, because the outer voltage magnitude is equivalent to the current error. In other words, the six-step flux controller automatically finds an operating point that is available with the full six-step voltages and the magnitude of the current command.

The modified-flux dq current request $i_{dq\_}{}^{r*}$new 17 is reduced by a current feedback term $i_{dq\_}{}^{r*}$fdbk 37 using a difference element 18. The current feedback term $i_{dq\_}{}^{r*}$fdbk 37 is derived from monitored current commands $u_{abc}$ 35 between the inverter 30 and the electric machine 40. A current regulator input term 19 including a difference between the modified-flux dq current request $i_{dq\_}{}^{r*}$new 17 and the dq current feedback term $i_{dq\_}{}^{r*}$fdbk 37 is input to the current regulator 20, which operates as described with reference to FIG. 2 to generate the dq voltage commands $u_{dq}$ 22. The current regulator input term 19 includes a d-axis synchronous frame stator current $I_{ds}{}^{r}$ 51 and a q-axis synchronous frame stator current $I_{qs}{}^{r}$ 53, which are shown and described with reference to FIG. 2.

The dq voltage commands $u_{dq}$ 22 are provided as inputs to the inverter 30, which is preferably a pulsewidth modulation (PWM) voltage source inverter that electrically couples to the AC motor 40. In response to the dq voltage commands $u_{dq}$ 22, the inverter 30 produces AC current commands $u_{abc}$ 35 that generate stator current in the windings of the electric machine 40 to drive rotation and torque output from the electric machine 40. Reverse transformation module 36 converts the AC current commands $u_{abc}$ 35 to the current feedback term dq current feedback $i_{dq\_}{}^{r*}$fdbk 37 using known dq-abc conversion methods.

Figure 2:
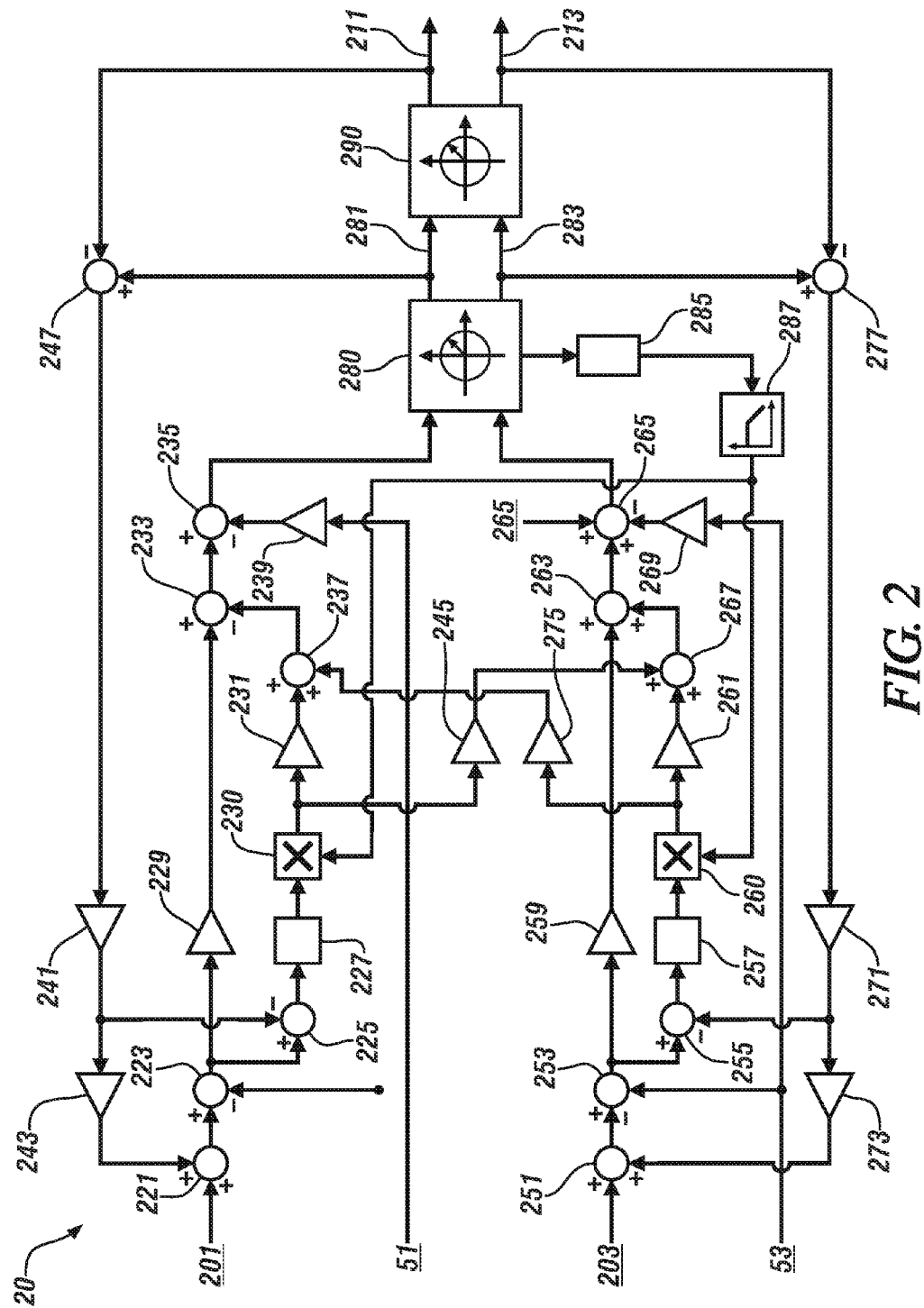
FIG. 2 schematically shows an embodiment of a current regulator that can be employed by a controller in a system for controlling an electric machine in a six-step mode, in accordance with the disclosure.

The reverse transformation module 36 transforms the AC current commands $u_{abc}$ 35, e.g., three-phase sinusoidal stator currents $i_{as}$, $i_{bs}$ and $i_{cs}$ into direct-quadrature (dq) terms including the current feedback $i_{dq\_}{}^{r*}$fdbk 37, which includes a d-axis synchronous frame commanded current $I_{ds}{}^{r*}$ 51 and a q-axis synchronous frame commanded current $I_{qs}{}^{r*}$ 53, which correspond to d-axis synchronous frame commanded current $I_{ds}{}^{r*}$ 201 and a q-axis synchronous frame commanded current $I_{qs}{}^{r*}$ 203 shown and described with reference to FIG. 2.

In one embodiment, sensing devices may be coupled to the electric machine 40 to sample the AC signals and supply these and other measured quantities to the controller 10. Measured quantities can include supply potential, e.g., a battery potential or high-voltage DC bus voltage $v_{dc}$ and the three-phase sinusoidal stator currents $i_{as}$, $i_{bs}$ and $i_{cs}$, although measurement of two of the phase currents may be sufficient when the electric machine 40 is a Y-connected machine without a neutral line. Rotational speed $\omega$ of the electric machine 40 and a rotor phase angle $\theta_r$ of the electric machine 40 are monitored, preferably with a sensor 41, which can be any suitable rotational speed/position sensor such as a resolver or a Hall-effect sensor.

The VSI controller 100 executes one or more programs to optimize commanded currents for a predetermined control parameter to determine operating inputs in the form of modified commanded currents, commanded voltages, torque commands, or the like to control the electric machine 40 via the current regulator 20. One or more of the components of the VSI controller 100 may be embodied in software or firmware, hardware, such as an application specific integrated circuit (ASIC), an electronic circuit, a processor (shared, dedicated, or group) and memory that execute one or more software or firmware programs, a combinational logic circuit, and/or other suitable components, or a combination thereof. In one embodiment, the VSI controller 100 is partitioned into one or more processing modules that are associated with one or more of the controller operations. For example, the current regulator 20 may be implemented as one of these processing modules. Although not shown, the controller 10 may include additional modules, such as a commanded current source, a torque module and a field-weakening voltage control module.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit(s), input/output circuit(s) and devices, signal conditioning and buffer circuitry and other components to provide a described functionality. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds. Communications between controllers and between controllers, actuators and/or sensors may be accomplished using a direct wired link, a networked communications bus link, a wireless link or any another suitable communications link.

FIG. 2 schematically shows an embodiment of the current regulator 20 that can be employed by a controller in a system for controlling an AC electric motor/generator, e.g., the VSI controller 100 described with reference to FIG. 1. The current regulator 20 generates commanded direct and quadrature voltages $V_{ds}^{r*}$ 281 and $V_{qs}^{r*}$ 283, respectively, which can be converted to commanded six-step direct and quadrature voltages $V_{ds}^{r}$ 211 and $V_{qs}^{r}$ 213, respectively, via a voltage magnitude limiter 290. The inverter 30 converts the commanded direct and quadrature voltages $V_{ds}^{r*}$ 281 and $V_{qs}^{r*}$ 283 and the commanded six-step direct and quadrature voltages $V_{ds}^{r}$ 211 and $V_{qs}^{r}$ 213 to pulsewidth-modulated stator currents $i_{as}$, $i_{bs}$ and $i_{cs}$ to drive an electric motor, e.g., the electric machine 40 described with reference to FIG. 1.

The current regulator 20 is a complex PI controller that includes a dq-voltage limit element 280 and anti-windup elements that include a current command compensation, thus providing stability in a heavy wind-up condition. Inputs to the current regulator 20 include command inputs including a d-axis synchronous frame commanded current $I_{ds}^{r*}$ 201 and a q-axis synchronous frame commanded current $I_{qs}^{r*}$ 203. Feedback inputs to the current regulator 20 include the d-axis synchronous frame stator current $I_{ds}^{r}$ 51 and the q-axis synchronous frame stator current $I_{qs}^{r}$ 53.

An anti-windup scheme limits operation in the six-step PWM mode as follows. Difference blocks 247 and 277 each calculate a difference between the commanded six-step direct and quadrature voltages $V_{ds}^{r}$ 211 and $V_{qs}^{r}$ 213, respectively, and the corresponding commanded direct and quadrature voltages $V_{ds}^{r*}$ 281 and $V_{qs}^{r*}$ 283, respectively. The resultants are multiplied by one of gains $k_{ad}$ 241 and $k_{qd}$ 271, respectively, and multiplied by one of second gains kdd 243 and $k_q$ 273, respectively, for addition to the d-axis synchronous frame commanded current $I_{ds}^{r*}$ 201 and the q-axis synchronous frame stator current $I_{qs}^{r}$ 53, respectively, in summing blocks 221 and 251, respectively. The second gains $k^d$ 243 and $k_q$ 273, respectively, provide current command compensation for anti-windup. Difference blocks 223 and 253 calculate a difference between the resultants and the d-axis synchronous frame commanded current $I_{ds}^{r}$ 51 and the q-axis synchronous frame stator current $I_{qs}^{r}$ 53, respectively.

The calculated differences from difference blocks 223, 253 are subjected to complex proportional-integral controls that include cross-over feedback control parameters. The complex proportional-integral controls include proportional gains $k_{pd}$ 229 and $k_{pq}$ 259, integral difference elements 225 and 255, delays 227 and 257, multipliers 230 and 260, cross-over integrator gains $k'_{id}$ and $k'_{iq}$ 245 and 275, integrator gains $k_{id}$ and $k_{iq}$ 231 and 261, summing elements 233, 237, 263 and 267, integrator clamp 287, gains $R_d$ 239 and $R_q$ 269, and summing elements 235 and 265, preferably arranged as shown with reference to FIG. 2. The outputs of the summing elements 235 and 265 are input to the dq-voltage limit element 280, which clamps the output voltage based upon a maximum voltage $V_{lim}$ and produces the DC commanded voltages $V_{ds}^{r*}$ 281 and $V_{qs}^{r*}$ 283, respectively. The DC commanded voltages $V_{ds}^{r*}$ 281 and $V_{qs}^{r*}$ 283, respectively are input to the voltage magnitude limiter 290 that calculates the commanded six-step direct and quadrature voltages $V_{ds}^{r}$ 211 and $V_{qs}^{r}$ 213 for controlling the electric machine 40.

Anti-windup is accomplished by multiplying gains $k^{ad}$ 241 and $k_{qd}$ 271, respectively, and second gains $k_d$ 243 and $k_q$ 273, respectively, for addition to the d-axis synchronous frame commanded current $I_{ds}^{r*}$ 201 and the q-axis synchronous frame stator current $I_{ds}^{r}$ 203, respectively, in summing blocks 221 and 251, respectively. The anti-windup compensation operates as follows. When the steady-state dq current command is near the voltage limit, the anti-windup algorithm can create steady-state error in the actual dq current. The amount of this steady-state current error is same as the voltage error used by the anti-windup elements, and is determined as follows.

$$\begin{bmatrix} i_{ds}^r \\ i_{qs}^r \end{bmatrix} = \begin{bmatrix} i_{ds}^* \\ i_{qs}^* \end{bmatrix} - \begin{bmatrix} k_{ad} & 0 \\ 0 & k_{aq} \end{bmatrix} \cdot \begin{bmatrix} v_{ds}^* - v_{ds}^r \\ v_{qs}^* - v_{qs}^r \end{bmatrix} \quad [1]$$

Using the above equation, the current command itself can be compensated as follows to eliminate the steady-state error.

$$\begin{bmatrix} i_{ds\_new}^{r*} \\ i_{qs\_new}^{r*} \end{bmatrix} = \begin{bmatrix} i_{ds}^* \\ i_{qs}^* \end{bmatrix} + \begin{bmatrix} k_{ad} & 0 \\ 0 & k_{aq} \end{bmatrix} \cdot \begin{bmatrix} v_{ds}^* - v_{ds}^r \\ v_{qs}^* - v_{qs}^r \end{bmatrix} \quad [2]$$

To give some degree of freedom in calibration process, two additional gains are created to adjust the amount of the current compensation. The final equation is as follows.

$$\begin{bmatrix} i^{r*}_{ds\_new} \\ i^{r*}_{qs\_new} \end{bmatrix} = \begin{bmatrix} i^{r*}_{ds} \\ i^{r*}_{qs} \end{bmatrix} + \begin{bmatrix} k_d & 0 \\ 0 & k_q \end{bmatrix} \cdot \begin{bmatrix} k_{cd} & 0 \\ 0 & k_{cq} \end{bmatrix} \cdot \begin{bmatrix} v^{r*}_{ds} - v^r_{ds} \\ v^{r*}_{qs} - v^r_{qs} \end{bmatrix} \quad [3]$$

The outer circle limit of dq voltage commands including integrator clamping is depicted as $v_{lim}$ 282 in the dq-voltage limit element 280.

In the six-step active mode, the current commands are determined with a voltage limit to prevent jittering between the six-step mode and the PWM mode. However, this can cause steady-state error in the dq current that can be accumulated in the integrator elements. To prevent integrator saturation, an additional voltage limit is employed. Thus, the current controller includes the dq-voltage limit element 280 and the voltage magnitude limiter 290. When the output of the current controller is clamped with dq-voltage limit element 280, the integrators are multiplied by $$\frac{V_{lim}}{|v^{r*}_{dq}|} 285,$$

causing the integrators to be clamped with phase information preserved.

This outer voltage also can be used as an indicator of the current error in the six-step active mode, because the magnitude of the inverter output voltage is fixed to six-step, $$\frac{2}{\pi} * Vdc$$

in me six-step active mode. In other words, as this voltage grows higher, the actual dq current has more steady-state error compared to its command. For this reason, this outer voltage is consumed in the six-step flux controller 50.

Complex PI control is accomplished by applying the crossover integrator gains k'$_{id}$ and k'$_{iq}$ 245 and 275 into opposite q, d integrators at summing elements 267, 237 respectively.

Feedback control is accomplished by first voltage limit 280 that generates the voltage $$\frac{V_{lim}}{|v^{r*}_{dq}|} 285$$

that is clamped by integrator clamp 287 and inserted into the integrators at both the multipliers 230 and 260.

Operation in the six-step mode is limited by the voltage magnitude limiter 290.

The complex PI controller with anti-windup including the current error is integrated with anti-windup terms first, and then the integrated current error is branched out for cross-coupling. Voltage clamping is thus applied to the actual dq currents.

In operation, the controller 10 may retrieve the commanded currents from a commanded current table stored in a memory of the controller 10. The commanded current table is preferably optimized for one or more predetermined control parameters (e.g., system efficiency) and may be derived from any number of models for optimizing the desired control parameter(s). Additionally, the commanded current table may be predetermined based on voltage and current limits of the electric machine 40 such that the commanded current source applies an appropriate amount of d-axis and q-axis currents to the electric machine 40 to produce a desired torque (e.g., with high efficiency) and maintain current regulation stability. The inverter voltage limits may be predetermined based on the supply voltage.

Figure 3:
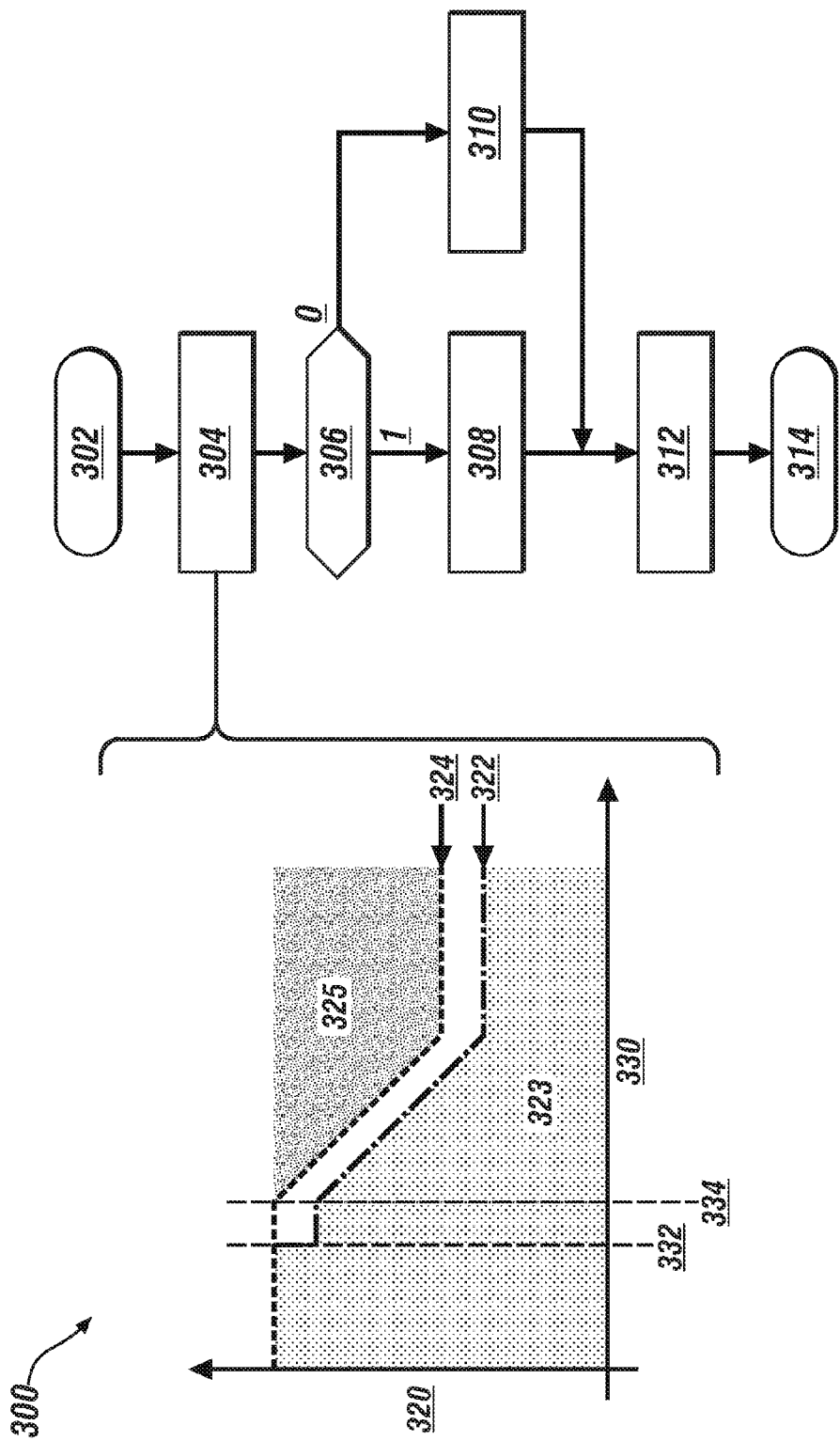
FIG. 3 schematically shows an embodiment of a six-step inverter control routine for determining when to control operation of an embodiment of an electric machine in a six-step mode including an embodiment of a threshold torque calibration including a first speed/torque operating region wherein the six-step mode is prohibited and a second speed/torque operating region wherein the six-step mode is permitted, in accordance with the disclosure.

FIG. 3 schematically shows an embodiment of a six-step activation routine 300 for determining when to control operation of an embodiment of the electric machine 40 described herein in a six-step active mode. Table 1 is provided as a key wherein the numerically labeled blocks and the corresponding functions are set forth as follows, corresponding to the six-step active routine 300.

TABLE 1

| BLOCK | BLOCK CONTENTS |
|---|---|
| 302 | Start |
| 304 | Select six-step threshold torque |
| 306 | Is commanded torque greater than threshold torque? |
| 308 | Permit six-step active routine |
| 310 | Prohibit six-step active routine |
| 312 | Index |
| 314 | End |

The six-step activation routine 300 is a scheduled task that executes periodically during ongoing operation, e.g., once every 100 microseconds or once every 500 microseconds. Upon initiating the six-step active routine 300 (302), a six-step threshold torque is selected based upon motor speed (304). A threshold torque calibration table is shown graphically, including motor speed on the horizontal axis 330 in relation to commanded motor torque on the vertical axis 320. Area 323 indicates a speed/torque operating region wherein the six-step active routine is prohibited and area 325 indicates a speed/load operating region wherein the six-step active routine is permitted, and further relates to flux-weakening speed/load operating region of the electric machine 40. Line 324 including minimum speed 334 delineates a threshold torque between area 323 and area 325 that is associated with increasing commanded motor torque. Line 322 including minimum speed 332 delineates a threshold torque between area 323 and area 325 that is associated with decreasing commanded motor torque. Torque associated with line 324 is greater than torque associated with line 322 throughout the region associated permitting the six-step active routine. Such speed/torque delineation between areas 323 and 325 allow introduction of hysteresis into the six-step active routine 300. The threshold torque calibration table can be implemented in software as a searchable multi-dimensional table, equations, or in any other suitable executable form.

When the commanded torque is greater than the threshold torque for the commanded torque as determined with reference to the threshold torque calibration table (306)(1), the six-step active control routine is permitted (308) and the VSI controller 100 described with reference to FIGS. 1 and 2 is employed to control the electric machine 40 using six-step inverter control.

When the commanded torque is less than the threshold torque for the commanded torque as determined with reference to the threshold torque calibration table (306)(0), the six-step active control routine is prohibited (310) and control of the electric machine 40 is accomplished using PWM inverter control. The iteration is indexed (312), and ends (314).

The VSI controller 100 described herein provides a modified current regulator in combination with a six-step flux controller and a six-step activation routine to provide closed loop current control when controlling an electric machine in six-step mode. Transitions between the six-step mode and the PWM mode can be executed without employing transient response management circuitry or algorithms that would otherwise be required to minimize current and torque spikes.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A voltage source inverter controller for controlling an inverter electrically connected to a permanent magnet synchronous multi-phase AC electric machine, comprising:
    a current command generator, a six-step flux controller, and a current regulator, wherein:
        the six-step flux controller generates a flux modifier to regulate flux in a flux-weakening speed/load operating region of the electric machine when operating the electric machine in a six-step mode;
        the current command generator converts a desired torque to three-phase desired currents that are input to a dq0-dq transformer and combined with the flux modifier to determine a modified-flux direct-quadrature (dq) current request; and
        the current command regulator includes a proportional-integral feedback controller, anti-windup elements, a dq voltage limit element and a voltage magnitude limiter, wherein the proportional-integral feedback controller and the anti-windup elements perform closed-loop current control on the modified-flux dq current request to determine commanded dq voltages, wherein:
            the dq-voltage limit element and the voltage magnitude limiter impose limits to the commanded dq voltages; and
            the inverter converts the limited commanded dq voltages to pulsewidth-modulated stator currents to drive the electric machine in the six-step mode.

2. The voltage source inverter controller of claim 1, wherein the six-step flux controller comprises a proportional-integral controller applied to an outer voltage error term determined based upon a magnitude of a voltage command input to the inverter.

3. The voltage source inverter controller of claim 1, further comprising the proportional-integral feedback controller includes proportional-integral feedback control applying cross-over integrator gains.

4. The voltage source inverter controller of claim 3, wherein the proportional-integral feedback controller includes proportional-integral feedback control applying cross-over integrator gains comprises the proportional-integral feedback controller applies the cross-over integrator gains into opposite integrators.

5. The voltage source inverter controller of claim 1, wherein the anti-windup elements comprise a current command compensation determined by multiplying differences between commanded six-step direct and quadrature voltages and corresponding commanded direct and quadrature voltages multiplied by second gains for addition to a d-axis synchronous frame commanded current and a q-axis synchronous frame stator current, respectively.

6. A controller for controlling an inverter electrically connected to an electric machine, comprising:
    a six-step flux controller generating a flux modifier;
    a current command generator converting a desired torque to three-phase desired currents that are input to a dq0-dq transformer and combined with the flux modifier to determine a modified-flux direct-quadrature (dq) current request;
    a proportional-integral feedback controller and anti-windup elements performing closed-loop current control on the modified-flux dq current request to determine commanded dq voltages;
    the dq-voltage limit element and the voltage magnitude limiter imposing limits on the commanded dq voltages; and
    the inverter converting the limited commanded dq voltages to pulsewidth-modulated stator currents to drive the electric machine in the six-step mode.

7. The inverter controller of claim 6, wherein the six-step flux controller generating a flux modifier comprises the six-step flux controller generating the flux modifier for closed loop flux control when operating the electric machine in a six-step mode.

8. The inverter controller of claim 6, wherein the six-step flux controller comprises a proportional-integral controller applied to an outer voltage error term determined based upon a magnitude of a voltage command input to the inverter.

9. The inverter controller of claim 6, further comprising the proportional-integral feedback controller including proportional-integral feedback control applying cross-over integrator gains.

10. The inverter controller of claim 9, wherein the proportional-integral feedback controller including proportional-integral feedback control applying cross-over integrator gains comprises the proportional-integral feedback controller applying the cross-over integrator gains into opposite integrators.

11. The inverter controller of claim 6, wherein the anti-windup elements comprise a current command compensation determined by multiplying differences between commanded six-step direct and quadrature voltages and corresponding commanded direct and quadrature voltages multiplied by second gains for addition to a d-axis synchronous frame commanded current and a q-axis synchronous frame stator current, respectively.

12. A method for controlling an inverter electrically connected to a permanent magnet synchronous multi-phase AC electric machine, comprising:
    generating a flux modifier to regulate flux in a flux-weakening speed/load operating region of the electric machine when operating the electric machine in a six-step mode;
    converting a desired torque to three-phase desired currents that are input to a dq0-dq transformer and combined with the flux modifier to determine a modified-flux direct-quadrature (dq) current request;
    performing closed-loop current control on the modified-flux dq current request to determine commanded dq voltages, including:
        imposing limits to the commanded dq voltages;
        converting the limited commanded six-step dq voltages to pulsewidth-modulated stator currents to drive the electric machine; and controlling the electric machine in the six-step mode responsive to the pulsewidth-modulated stator currents.

13. The method of claim 12, wherein generating a flux modifier to regulate flux in a flux-weakening speed/load operating region of the electric machine when operating the electric machine in a six-step mode comprises applying proportional-integral control to an outer voltage error term determined based upon a magnitude of a voltage command input to the inverter.

14. The method of claim 12, wherein performing closed-loop current control on the modified-flux dq current request to determine commanded dq voltages comprises performing proportional-integral feedback control applying cross-over integrator gains.

15. The method of claim 14, wherein performing proportional-integral feedback control applying cross-over integrator gains comprises performing proportional-integral feedback control including applying the cross-over integrator gains into opposite integrators.

16. The method of claim 12, further comprising employing anti-windup elements including employing a current command compensation determined by multiplying differences between commanded six-step direct and quadrature voltages and corresponding commanded direct and quadrature voltages multiplied by second gains for addition to a d-axis synchronous frame commanded current and a q-axis synchronous frame stator current, respectively.

* * * * *